United States Patent [19]

Lee et al.

[11] Patent Number: 5,059,433

[45] Date of Patent: Oct. 22, 1991

[54] METHOD OF PREPARING SHELF STABLE, FILLED DOUGH FOOD PRODUCTS

[75] Inventors: Yanien Lee, Manlius; Catherine E. Hoyda, Liverpool; Carleton G. Merritt, Phoenix, all of N.Y.

[73] Assignee: Borden, Inc., Columbus, Ohio

[21] Appl. No.: 603,921

[22] Filed: Oct. 26, 1990

[51] Int. Cl.$^5$ .............................................. A21D 2/00
[52] U.S. Cl. .................................... 426/94; 426/283; 426/451; 426/557
[58] Field of Search ................. 426/94, 557, 451, 283

[56] References Cited

U.S. PATENT DOCUMENTS

| | | | |
|---|---|---|---|
| 3,281,248 | 10/1966 | Fioravanti et al. | 426/451 |
| 4,401,681 | 8/1983 | Dahle | 426/557 |
| 4,493,850 | 1/1985 | Fioravanti | 426/283 |
| 4,529,609 | 7/1985 | Galhring et al. | 426/557 |
| 4,597,976 | 7/1986 | Doster et al. | 426/557 |
| 4,659,576 | 4/1987 | Dahle et al. | 426/557 |
| 4,693,901 | 9/1987 | Hallah | 426/613 |
| 4,876,104 | 10/1989 | McGuire et al. | 426/557 |
| 4,898,744 | 2/1990 | Liggett et al. | 426/94 |
| 4,915,966 | 4/1990 | Guarneri | 426/557 |

*Primary Examiner*—Jeanette Hunter
*Assistant Examiner*—Mary S. Mims
*Attorney, Agent, or Firm*—Dennis H. Rainear; Kenneth P. Van Wyck

[57] ABSTRACT

The invention relates to a shelf stable, filled pasta product and a process for preparing same. A pasta casing is prepared from a dough of flour, water and optionally eggs, and a filling material of, for example, beef, chicken or cheese, is placed inside the pasta dough casing. During drying, an equilibration of moisture contents occurs between the pasta and the filling material whereby a final moisture content of about 18–22% by weight and a water activity ($A_w$) of not more than 0.85 are achieved. By this process is produced a filled pasta product with non-refrigerated shelf life exceeding nine months.

32 Claims, No Drawings

METHOD OF PREPARING SHELF STABLE, FILLED DOUGH FOOD PRODUCTS

BACKGROUND OF THE INVENTION

This invention relates to a method of preparing and preserving filled dough food products.

Filled or stuffed dough food products refer herein to those food products which comprise relatively small casings of dough, of any geometrical or fancy shapes, filled with a mixture or "emulsion" of chopped meat, vegetables, cheese, spices, etc., and are best known by their traditional names of "ravioli", "tortellini", "capelletti", "canelloni", etc.

In the case of stuffed pasta such as ravioli, tortellini, cannelloni and the like, long standing problems such as the inability to preserve the stuffed pasta in a good state for a certain period of time has been unresolved. Several processes have been developed to insure that neither the outer shell portion nor the inner stuffing which generally constitute meat, greens, cheese and other suitable stuffing, undergo deterioration between production and consumption.

The filler or filling of the above filled dough food products comprises a lump of food material such as meat, or other mixture, wrapped in a sheet of new-made dough. A special problem encountered in the instance of filled dough products is that improving the taste quality of the filler by enhancing its flavor, often brings about a deterioration of the appearance and properties of the casing formed from dough.

Known are treatments for preserving, over a short or long period of time, such filled dough food products which provided for the drying thereof (which drying process would generally continue spontaneously even after the drying treatment proper has been completed), but it is also known that this resulted in the dough casings becoming brittle, developing cracks, and finally turning to crumbles, thereby their appearance made them totally unsuitable for sale.

In conventional filled food products, such as tortellini, both the dough and the filling material commonly have 31-32% moisture by weight, and an $A_w$ of 0.92-0.97. These products are dried at 60°-65° C. for 18-24 hours and the finished products require 16-20 minutes cooking time.

Moreover, a deep drying treatment could damage the filler as well as the dough casing, because, as is well known in the art, dehydrated meat does not "recover" with the simple addition of water, not even boiling water. Lastly, the deep drying effect brought about by conventional preservation methods can result in an undue loss of weight.

On the other hand, deep freezing encourages cracking and disgregation of dough owing to the surface dehydration caused by the application of cold. Moreover, deep freezing involves high refrigeration costs for production distribution, and conservation.

Finally, dehydration is likely to result in the dough developing surface cracks, in the deterioration of the filler owing to the high temperatures involved, in a degradation of the flavor due to partial evaporation of spices, in an increased cost of the product due to the loss of weight brought about by the drying process and so forth.

Therefore, the methods proposed heretofore for preparing or preserving filled dough food products have failed to provide an acceptable shelf stable filled dough food product.

Limiting "water activity" ($A_w$) in intermediate moisture foods has become an important method of preventing microbial decomposition. Water activity is the measure in a system of the unbound free water available to support biological and chemical reactions. One measure of water activity is $A_w = P/P_o$, where P is the vapor pressure of water in the system (food item) and $P_o$ is the vapor pressure of pure water a the same temperature. Lowering $A_w$ restricts the growth of bacteria and is accomplished by lowering P, the vapor pressure of water in the food item. P may be depressed by including sufficient amounts of solutes in the food item. The drop in P is in accordance with Raoult's law which states that $P = A_w P_o$, where $A_w$ is also the ratio of moles of solvent over sum of moles of solute plus solvent, i.e. $n_2$ divided by $(n_1 + n_2)$, where $n_1$ = moles solute and $n_2$ = moles of solvent. For a 1 molal solution of an ideal solute, $A_w = P$ divided by $P_o$. Thus, $n_2$ divided by $(n_1 + n_2) = 55.51$ divided by $(55.51 + 1)$, or 0.9823. Typical solutes employed in foods are sucrose, glucose, invert sugar, salts such as sodium chloride, propylene glycol, incompletely hydrolyzed starches, and the like.

Most bacteria of concern in food preservation require $A_w$ values of 0.90 or greater to grow. There are some halophilic bacteria that grow at $A_w$ values down to 0.75, but they seldom cause food spoilage. Molds, however, will grow at $A_w$ levels down to about 0.65 which is too low for most food to retain an intermediate moisture content. Semimoist foods usually have $A_w$ values between 0.70 and 0.85. An antimycotic is generally included, therefore, to inhibit molds at semimoist levels.

Canadian Patent, 1162099, discloses a process for making a filled dough food product which comprises subjecting the filled dough food product (such as ravioli) to a high moisture environment from 70° C.-100° C. to thereby dry the product until the dough portion reaches a moisture content level of 16-19%, then packaging the product to 70° C. -100° C.

U.S. Pat. No. 4,493,850, issued Jan. 15, 1985 to Fioravanti, relates to but does not conform to Canadian Patent No. 1162099. U.S. Pat. No. '850 discloses subjecting a filled dough food product (such a ravioli) to a high moisture environment at 70° C. -100° C. and subsequently drying the product until the dough portion reaches an average moisture content of 23-28%. The product is then packaged and must be subjected to a temperature of from 70° C. -100° C.

Gaehring, et al., U.S. Pat. No. 4,529,609 (issued July 16, 1985) relates to a pasta product that is dried to a moisture content of no less than about 15% and $A_w$ level of no more than about 0.85. Gaehring, et al. require that their pasta dough comprise finely divided salt. The salt plays a critical role in the successful application of the Gaehring invention. First, the salt allows the use of flour other than durum semolina. It interacts with the protein molecules in the dough at their polar sites modifying the teritiary structure of the proteins which results in increased flexibility. Second, the salt reduces surface tension of the water which enables more complete hydration of the protein and starch granules. Third, the salt reduces the amount of free water (i.e., lowering $A_w$) which prevents spoilage and results in long shelf stability. As used therein, the term "salt" encompasses any edible highly dissociative $A_w$-depressing solute that provides electrolytes which associate with the polar sites of the protein contained in the flour.

Doster, et al., U.S. Pat. No. 4,597,976, issued July 1, 1986, describes a ravioli formed by filling sheeted dough (about 0.16 inches thick) with an acidified meat filling. After a steaming step, the ravioli is packaged together with a sauce.

Liggett, et al., U.S. Pat. No. 4,898,744, issued Feb. 6, 1990 disclose a fresh stuffed pasta made from dough that has been sheeted to a thickness of about 0.04 inches. The stuffed pasta is pasteurized before it is packaged and must be stored at 40° F. -50° F.

U.S. Pat. No. 4,915,966, issued Apr. 10, 1990 to Guarneri, teaches a method of making dried pasta having a relative moisture content of about 32% by weight while controlling the $A_w$ at levels equal to or higher than 0.86.

One conventional process previously utilized to obtain longer storage time consists of utilizing special driers. This process, however, proved unsatisfactory. Other attempts such as freezing and overfreezing the stuffed pastas into special cooling equipment; canning of the product and subsequently processing in an autoclave; and using germicide lamps or irradiations, for example gamma rays, emitted by radioactive isotopes, all proved to be impractical and uneconomical.

Generally, the filled food products which have undergone normal drying (18–24 hours at up to 150° F., using 31–32% moisture in both the pasta and filling) can only be stored for short periods of time which varies based on the composition of the stuffing and the conditions under which the product was prepared. However, even if proper drying of the outer casing is achieved, longer term storage would be limited mainly because of the composition of the stuffing. Attempts to overcome this problem are disclosed in U.S. Pat. No. 3,281,248 by Fioravanti, et al., wherein stuffed pasta shells are immersed into a liquid selected from water, broth and a mixture of water and oil, said liquid having a temperature of from 65° to 120° C. for a period of time ranging from 1 to 240 seconds, followed by removing the stuffed shell from the liquid and heating same to temperatures ranging from 70° to 225° C. for a period of time ranging from 30 seconds to 30 minutes. None of these references, however, teaches maintaining freshness in texture, appearance and taste of a pasta product over extended period of time.

It is, therefore, an object of the present invention to provide a filled or stuffed pasta or dough food product that maintains its freshness for extended periods of time at ambient temperature.

Another object of the present invention is to provide a process for preserving stuffed pasta which maintains its shelf life for extended periods of time.

SUMMARY OF THE INVENTION

The present invention relates to a method of preparing a filled or stuffed dough food product which remains shelf stable without refrigeration for at least nine months, and preferably, more than 12 months. During the drying of the filled food product, an equilibration takes place in the food product whereby the initial moisture contents of the dough (23–38% by weight) and of the filling material (16–28% by weight) equilibrate to a net product moisture content of about 18–22% by weight. The long shelf life is achieved by maintaining a net water activity level ($A_w$) in the product below about 0.85. At an $A_w$ of 0.85 or below, pathogenic microorganisms will not grow in the food product thereby enhancing product shelf life.

DISCLOSURE OF INVENTION

It is an object of the present invention to provide a shelf stable, quick cooking, filled dough food product which does not suffer the disadvantages of the prior art semimoist and dried filled pasta products.

More specifically, it is an object of the present invention to provide a high quality, low moisture, filled pasta product which is quick cooking and highly acceptable to consumers.

It is also an object of this invention to provide a filled pasta product which is shelf stable, without refrigeration, for at least nine months.

Thus, the invention is directed to a process for preparing filled dough food products, which comprises the steps of:

(a) preparing an alimentary dough from flour and water, wherein the moisture content of the dough is in the range of from 22–38% by weight;
(b) surrounding a mass of a filling material with the dough from step (a), wherein the filling material has a water activity ($A_w$) of less than about 0.85;
(c) at least partially drying the filled dough food product to reduce the moisture content to less than about 22% by weight, whereby a filled dough food product is produced with an $A_w$ of less than about 0.85.

In the above process, whole eggs or egg white solids can also be incorporated into the dough.

The process utilized in the present invention is suitable for the production of a wide variety of filled pastas. The first step in the process is the preparation of a uniform dough blend comprising flour, eggs (whole or whites) and water. The type of flour used may be, for example, Durum wheat, soft wheat, whole wheat flour and other flours suitable for the preparation of pasta dough such as corn flour, rice flour, potato flour to name a few. The amount of water in the dough generally ranges from about 23% to about 38% by weight of the uniform blend and preferably from about 28% to about 32%. The amount of flour in the mixture generally range from about 57% to about 77% and preferably is about 68% by weight. The amount of whole eggs or egg whites generally ranges from about 0.1% to about 5.0% by weight of the mixture and preferably is about 2.0% by weight.

Optionally, other materials may be utilized in the preparation of the pasta dough. For instance, protein materials such as egg yolk, wheat gluten, soy protein isolate and the like may be added to the flour in amounts ranging from about 0.!% to about 5.0% by weight of the flour. Process aid materials such as sodium alginate, potassium alginate, glycerides and other suitable gum may also be added in amounts ranging from about 0.1% to about 5.0% by weight. Also, surfactants such as glycerol monostearate may be present in amounts ranging from about 0.1% to about 5.0% by weight. Ethanol or glycerol or both can also be added to improve the pliability of the dough. Thus, in a particularly preferred embodiment, when the moisture content in the dough is about 23%–25% by weight, ethanol and/or glycerol are added at 0.1 to 5.0% by weight.

If desired, vegetable materials such as spinach, carrot or tomato or flavors and concentrate of vegetable materials may be added to the flour to produce flavored pasta dough such as spinach pasta. These vegetable materials, if desired, are generally present in amounts ranging from about 0.1% to about 5.0% by weight of the flour.

The flour, eggs and water, and any optional ingredients are mixed to form a uniform blend by conventional means and monitored to ensure complete mixing. Suitable mixers can include paddle mixers, ribbon mixers, continuous macaroni mixers, and the like.

The dough is preferably extruded or sheeted to a thickness of from about 0.025 to 0.035 inches.

Independent of the preparation of the dough, a filling material or mix is also prepared. The composition of the filling mix will vary depending on the desired end product. For instance, in the case of tortellini, the filling mix can comprise Romano cheese, Parmesan cheese, Fontina cheese, Ricotta cheese, or other cheese, egg white, whole egg, water, bread crumbs and spices. Also preferred herein as filling material are chicken and beef. The filling material should preferably have a moisture content below 28% by weight and preferably 16 to 28% by weight, and an $A_w$ of 0.65 to 0.85. The filling components are mixed thoroughly at room temperature, cooled down to a temperature ranging from about 35° F. to about 60° F. and kept at that temperature until use. The cheese utilized in the filling mix should generally be kept refrigerated prior to use. Lowering the temperature of the filling mix serves the purpose of retarding microbial growth and aids in the extrusion and filling of the dough component.

The conditioned dough and filling mix are transferred to the filling machine where the filling mix is encased by the dough. In the present invention a conventional forming machine is utilized wherein a small filled casing or shell of dough having preferred thickness of about 0.025 to 0.035 inches is produced. The temperature of the filling mix should preferably be maintained about 40° F. Temperatures above 40° F. will enhance microbial growth. Also, to enhance preservation, the pH of filling mix may be adjusted to a pH below 4.6 and preferably about 4.0 to 4.5. Typically, this is accomplished by the use of food grade acids known to those skilled in the art.

The filled product is then conveyed to a drier and heated for a time and at a temperature and humidity sufficient to reduce the moisture content to 18-22% by weight in the product. The heating step also sets the protein in the pasta which allows the pasta to subsequently be cooked very quickly. The humidity in the drier is preferably 40 to 75% RH. The temperature within the drier is generally sufficient to achieve a product center temperature of above 200° F., said temperature generally ranging from 200° F. to 250° F. Suitable temperature, however, generally ranges from 205° F. to 210° F. The length of time the product remains in the drier is generally determined by the time it takes to achieve the internal product temperature of 200° F. The length of time, however, generally ranges from about 15 minutes to about 45 minutes and preferably about 20 to 30 minutes. It is further believed that the drying process destroys enzymes naturally present within the filled dough, thus preventing such enzymes from affecting the color and flavor of the final product. During the drying stage, an equilibration takes place in the food product whereby the initial moisture contents of the dough (23-38% by weight) and of the filling material (16 to 28% by weight) equilibrate to a moisture content of about 18-22% by weight and a final water activity of 0.85 or less. The filled pasta thus produced has a moisture content of 18-22% by weight and exhibits non-refrigerated shelf life of nine to twelve months.

The partially dried filled pasta is then packaged, for example, in a vapor barrier pouch and is pasteurized.

The filled pasta product of the present invention can be cooked in as little as eight minutes as compared to traditionally dried filled pasta products which require 12-16 minutes cooking time.

It will be appreciated from the foregoing that the method according to this invention fully achieves its objects. It should be understood, however, that the description provided hereinabove, as referred to a preferred embodiment of the inventive method, is merely illustrative, and the scope of the present invention encompasses all those modifications and variations which can present themselves to one skilled in the art.

EXAMPLE 1

| Ingredient | Percent, by weight |
| --- | --- |
| Durum flour or semolina | 76.05 |
| Egg white or whole egg solids | 2.15 |
| Water | 21.80 |

EXAMPLE 2

| Formula of Beef Filling | |
| --- | --- |
| Ingredient | Percent, by weight |
| Dehydrated Beef | 27.92 |
| Beef Meat Paste | 19.61 |
| Bread Crumbs | 34.72 |
| Vegetable Oil | 7.84 |
| Glycerol | 1.92 |
| Seasonings (onion, garlic, white pepper) | 2.57 |
| Water | 5.42 |

EXAMPLE 3

| Formula of Chicken Filling | |
| --- | --- |
| Ingredient | Percent, by weight |
| Chicken Meat Paste (Cooked) | 51.96 |
| Bread Crumbs | 37.25 |
| Sodium Chloride | 1.96 |
| Starch | 3.04 |
| Seasonings (celery seeds, sage, etc.) | 0.40 |
| Water | 5.39 |

EXAMPLE 4

| Formula of Cheese Filling | |
| --- | --- |
| Ingredient | Percent, by weight |
| Dehydrated Parmesan Cheese | 52.38 |
| Parmesan Cheese Paste (enzyme modified) | 8.29 |
| Bread Crumbs | 14.45 |
| Glycerol | 6.57 |
| Sodium Chloride | 3.50 |
| Frozen Whole Eggs | 14.11 |
| Seasonings | 0.70 |

EXAMPLE 5

| Moisture & Water Activity of Shelf-Stable Tortellini | | | |
| --- | --- | --- | --- |
|  | Beef | Chicken | Cheese |
| Moisture (%) After Formed & Before Dried | 29.25 | 28.67 | 29.09 |
| [1]Water Activity ($A_w$) | 0.915 | 0.915 | 0.936 |

-continued

| Moisture & Water Activity of Shelf-Stable Tortellini | | | |
|---|---|---|---|
| | Beef | Chicken | Cheese |
| Moisture (%) After Dried | 20.23 | 19.83 | 19.20 |
| [2]Water Activity ($A_w$) | 0.843 | 0.817 | 0.841 |

[1]$A_w$ value is for the filled product before drying.
[2]$A_w$ value is for the filled product after drying and equilibration.

EXAMPLE 6

| Moisture & Water Activity of Shelf-Stable Beef Tortellini | | |
|---|---|---|
| | Filling | Dough |
| Moisture (%), Initial | 28.20 | 32.00 |
| Water Activity ($A_w$), Initial | 0.770 | 0.975 |
| Water Activity ($A_w$), After Formed | 0.873 | 0.936 |
| Water Activity ($A_w$), After Dried | 0.833 | 0.843 |

EXAMPLE 7

| Moisture & Water Activity of Shelf-Stable Chicken Tortellini | | |
|---|---|---|
| | Filling | Dough |
| Moisture (%), Initial | 24.77 | 32.00 |
| Water Activity ($A_w$), Initial | 0.737 | 0.975 |
| Water Activity ($A_w$), After Formed | 0.860 | 0.946 |
| Water Activity ($A_w$), After Dried | 0.810 | 0.793 |

EXAMPLE 8

| Moisture & Water Activity of Shelf-Stable Cheese Tortellini | | |
|---|---|---|
| | Filling | Dough |
| Moisture (%), Initial | 27.28 | 32.00 |
| Water Activity ($A_w$), Initial | 0.757 | 0.975 |
| Water Activity ($A_w$), After Formed | 0.866 | 0.950 |
| Water Activity ($A_w$), After Dried | 0.829 | 0.841 |

That which is claimed is:

1. A process for preparing filled dough food products, which comprises the steps of:
   (a) preparing an alimentary dough from flour and water, wherein the $A_w$ of the dough is above 0.85;
   (b) surrounding a mass of filling material with the dough from step (a) to produce a filled dough food product, wherein the filling material has a water activity ($A_w$) of less than about 0.85;
   (c) allowing the food product of step (b) to at least partially equilibrate, whereby moisture moves from the dough into the filling material;
   (d) at least partially drying the filled dough food product at 40 to 75% relative humidity and a temperature sufficient to reduce the moisture content to less than about 22% by weight, whereby a filled dough food product is produced with an $A_w$ of less than about 0.85.

2. The process of claim 1 wherein the food product is dried in step (d) at a temperature of from 200° to 250° F., and wherein the partially dried filled dough food product is packaged and pasteurized, and has a room temperature shelf life exceeding nine months.

3. The process of claim 1 wherein the filling material has a moisture content of 16 to 28% by weight and is selected from the group consisting of cheese, chicken and beef.

4. The process of claim 1 wherein the filling material is selected from the group consisting of Romano cheese, Parmesan cheese, Fontina cheese and Ricotta cheese.

5. The process of claim wherein the filling material is chicken.

6. The process of claim 1 wherein the filling material is beef.

7. The process of claim 1 wherein the filled dough food product is in the form of filled dough shells selected from the group consisting of ravioli, tortellini, cappelletti and canelloni.

8. The process of claim 1 wherein the filled dough food product is in the form of ravioli.

9. The process of claim 1 wherein the filled dough food product is in the form of tortellini.

10. The process of claim 1 wherein the filled dough food product is in the form of cappelletti.

11. The process of claim 1 wherein the filled dough food product is in the form of canelloni.

12. The process of claim 1 wherein the dough comprises flour from durum wheat.

13. The process of claim 1 wherein the dough comprises flour from soft wheat.

14. The process of claim 1 wherein the dough comprises whole wheat flour.

15. The process of claim 1 wherein the dough comprises corn flour.

16. The process of claim 1 wherein the dough comprises rice flour.

17. The process of claim 1 wherein the dough comprises potato flour.

18. The process of claim 1 wherein the moisture content of the alimentary dough is in the range of 23-25% by weight, and wherein the dough further comprises 0.1% to 5.0% by weight ethanol.

19. The process of claim 1 wherein the moisture content of the alimentary dough is in the range of 23-25% by weight, and wherein the dough further comprises 0.1% to 5.0% by weight glycerol.

20. The process of claim 1 wherein the alimentary dough further comprises eggs.

21. The process of claim 20 wherein the eggs are whole eggs.

22. The process of claim 20 wherein the eggs are egg white solids.

23. The process of claim 20 wherein the dough comprises by weight:
   57% to 77% flour
   0.1% to 5.0% whole eggs and
   23% to 38% water.

24. The process of claim 20 wherein the dough comprises by weight:
   57% to 77% flour
   0.1% to 5.0% egg white solids and
   23% to 38% water.

25. A filled dough food product comprising a partially dried dough casing comprising flour and water, and a filling material within the dough casing, wherein the filling material is selected from the group consisting of cheese, beef, and chicken, and wherein the moisture content of the food product has equilibrated to about 18-22% by weight and has an $A_w$ of not more than 0.85.

26. The filled dough food product of claim 25 wherein the dough comprises a flour selected from the group consisting of durum wheat flour, soft flour, whole wheat flour, corn flour, rice flour and potato flour.

27. The filled dough food product of claim 25 wherein the dough further comprises eggs.

28. The filled dough food product of claim 25 wherein the dough comprises by weight:
57% to 77% flour
0.1% to 5.0% whole eggs and
23% to 38% water.

29. The filled dough food product of claim 25 wherein the doug comprises by weight:
57% to 77% flour
0.1% to 5.0% egg white solids and
23% to 38% water.

30. The filled dough food product of claim 25 wherein the eggs are whole eggs.

31. The filled dough food product of claim 25 wherein the eggs are egg whites.

32. The filled dough food product of claim 25 which is cookable in about eight minutes.

* * * * *